(12) United States Patent
Niu et al.

(10) Patent No.: US 9,505,938 B2
(45) Date of Patent: Nov. 29, 2016

(54) SWELLABLE PRE-TREATMENT COATING

(71) Applicant: HEWLETT-PACKARD DEVELOPMENT COMPANY, L.P., Houston, TX (US)

(72) Inventors: Bor-Jiunn Niu, San Diego, CA (US); Haigang Chen, San Diego, CA (US); Jason Swei, San Diego, CA (US); Sandeep Bangaru, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/654,963

(22) PCT Filed: Jan. 31, 2013

(86) PCT No.: PCT/US2013/024064
§ 371 (c)(1),
(2) Date: Jun. 23, 2015

(87) PCT Pub. No.: WO2014/120186
PCT Pub. Date: Aug. 7, 2014

(65) Prior Publication Data
US 2015/0344708 A1    Dec. 3, 2015

(51) Int. Cl.
*B41M 5/00* (2006.01)
*C09D 7/12* (2006.01)
(Continued)

(52) U.S. Cl.
CPC ............. *C09D 7/1233* (2013.01); *B41M 5/52* (2013.01); *B41M 5/5218* (2013.01); *B41M 5/5227* (2013.01); *B41M 5/5236* (2013.01); *B41M 5/5245* (2013.01); *B41M 5/5254* (2013.01); *B41M 5/5263* (2013.01); *C08G 73/0293* (2013.01); *C09D 7/1216* (2013.01); *C09D 7/1275* (2013.01); *C09D 7/1283* (2013.01); *C09D 129/04* (2013.01); *C09D 177/00* (2013.01); *C09D 179/02* (2013.01);
(Continued)

(58) Field of Classification Search
CPC ............ B41M 5/5227; B41M 5/5245; B41M 5/5254; B41M 5/0017; C09D 7/1216; C09D 7/1283
See application file for complete search history.

(56) References Cited

U.S. PATENT DOCUMENTS

| 6,513,924 B1 * | 2/2003 | Goldberg ............... B41J 3/4078 347/102 |
| 6,906,019 B2 | 6/2005 | Nitzan et al. |

(Continued)

FOREIGN PATENT DOCUMENTS

| CN | 101111372 | 1/2008 |
| CN | 102378693 | 3/2012 |

(Continued)

*Primary Examiner* — Betelhem Shewareged
(74) *Attorney, Agent, or Firm* — Thorpe, North & Western L.L.P.

(57) ABSTRACT

The present disclosure provides swellable pre-treatment compositions, printable media, and related methods. As such, a swellable pre-treatment coating for a print medium can include an evaporable solvent, a matrix, and a wax. The matrix can include from 10 wt % to 20 wt % of a fixer, from 25 wt % to 35 wt % of aluminum chlorohydrate, from 0.5 wt % to 10 wt % of a first binder, from 20 wt % to 30 wt % of a second cross-linkable binder, and from 1 wt % to 5 wt % of a cross-linker. The wax can be present at from 10 wt % to 20 wt %, The weight percentages of the matrix and the wax are based on a total amount present in the swellable pre-treatment coating after removal of the evaporable solvent.

21 Claims, 1 Drawing Sheet

(51) Int. Cl.
  *B41M 5/52* (2006.01)
  *C09D 129/04* (2006.01)
  *C09D 177/00* (2006.01)
  *C09D 179/02* (2006.01)
  *C08G 73/02* (2006.01)
  *C08L 91/06* (2006.01)

(52) U.S. Cl.
  CPC .......... *B41M5/0017* (2013.01); *B41M 5/5281* (2013.01); *C08L 91/06* (2013.01)

(56) References Cited

U.S. PATENT DOCUMENTS

| | | |
|---|---|---|
| 8,092,873 B2 | 1/2012 | Wang et al. |
| 8,252,373 B2 | 8/2012 | Song et al. |
| 2003/0219539 A1 | 11/2003 | Nigam |
| 2008/0254240 A1 | 10/2008 | Niu et al. |
| 2010/0013875 A1 | 1/2010 | Diederen et al. |
| 2010/0295891 A1 | 11/2010 | Goto et al. |
| 2011/0104410 A1 | 5/2011 | Toles et al. |
| 2011/0148980 A1 | 6/2011 | Arai et al. |
| 2011/0303113 A1 | 12/2011 | Sarkisian et al. |
| 2012/0034398 A1 | 2/2012 | Wang et al. |
| 2012/0050432 A1 | 3/2012 | Kawakami |
| 2012/0169808 A1 | 7/2012 | Kiyomoto et al. |
| 2013/0293647 A1* | 11/2013 | Dannhauser ......... B41M 5/0017 347/102 |

FOREIGN PATENT DOCUMENTS

| | | |
|---|---|---|
| CN | 102407708 | 4/2012 |
| JP | 2004276253 | 10/2004 |
| WO | 2006083032 | 8/2006 |

* cited by examiner

SWELLABLE PRE-TREATMENT COATING

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection or piezoelectric pressure or oscillation onto the surface of a media.

Pre-treatment compositions or coatings can likewise be applied to various media to improve printing characteristics and attributes of an image. Such composition can be substantially colorless and can be formulated to interact with the colorant and/or with polymeric components of certain ink compositions. With the use of such pre-treatment compositions, precipitated colorants deposited on the surface of recording media can provide enhancement of image quality. For example, improved optical density and high speed printing may be achieved with such pre-treatment compositions. However, many pre-treatment formulations that are acceptable in one area are not as acceptable in others, and thus, research and development related to pre-treatment formulations that can produce higher quality print images on the print media surfaces continue to be sought.

BRIEF DESCRIPTION OF THE DRAWINGS

Additional features and advantages of the disclosure will be apparent from the detailed description which follows, taken in conjunction with the accompanying drawings, which together illustrate, by way of example, features of the invention; and, wherein.

Figure 1:
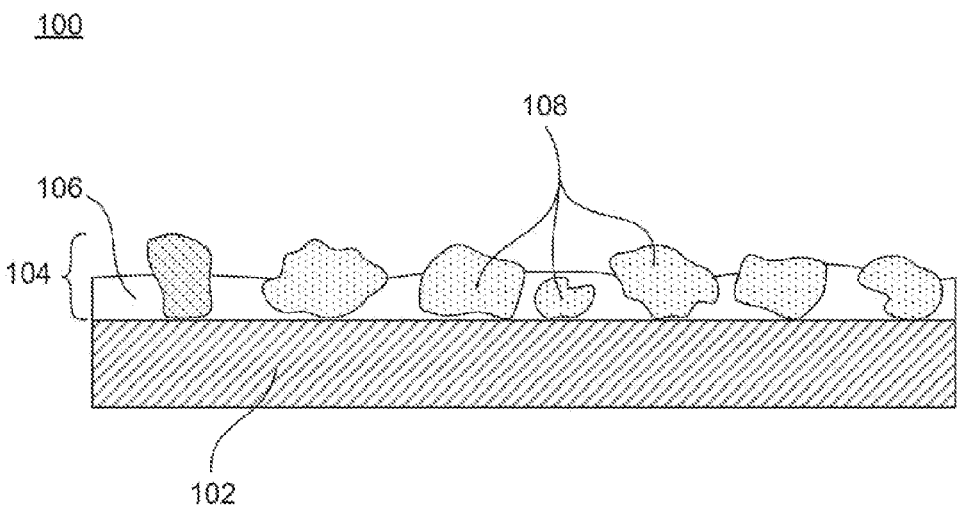
FIG. 1 provides a cross-sectional view of a swellable pre-treatment coating on a print medium in accordance with an example of the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

It has been recognized that traditional pre-treatment coatings that can provide high quality print images lack durability when used in packaging applications or similar applications that subject the printed images to a high degree of surface contact. As such, it has been discovered that the use of a swellable pre-treatment coating can be particularly useful for packaging media, where the swellable pre-treatment coating includes wax particles. It has been found that the present swellable pre-treatment coating can provide excellent durability such as scratch resistance for packaging media thereby preserving the quality of the printed image. Specifically, the swellable pre-treatment coating can contain wax particles having a particle size that is greater than the thickness of the underlying matrix of the swellable pre-treatment coating, thereby providing a structure that minimizes contact of the underlying matrix and any ink printed thereon from contact with adjacent substrates or objects.

It is noted that when discussing the present compositions and methods, each of these discussions can be considered applicable to each of these examples, whether or not they are explicitly discussed in the context of that example. Thus, for example, in discussing a wax in a swellable pre-treatment coating, such a wax can also be used in a method of providing a durable coating to a print medium, and vice versa.

As such, a swellable pre-treatment coating for a print medium can include an evaporable solvent, a matrix, and a wax. The matrix can include from 10 wt % to 20 wt % of a fixer, from 25 wt % to 35 wt % of aluminum chlorohydrate, from 0.5 wt % to 10 wt % of a first binder, from 20 wt % to 30 wt % of a second cross-linkable binder, and from 1 wt % to 5 wt % of a cross-linker. The wax can be present at from 10 wt % to 20 wt %. The weight percentages of the matrix and the wax are based on a total amount present in the swellable pre-treatment coating after removal of the evaporable solvent.

In another example, a printable medium can include a media substrate and a swellable pre-treatment coating applied thereto. The swellable pre-treatment coating can include a matrix and wax particles. The matrix can include from 10 wt % to 20 wt % of a fixer, from 25 wt % to 35 wt % of aluminum chlorohydrate, from 0.5 wt % to 10 wt % of a first binder, from 20 wt % to 30 wt % of a second cross-linkable binder, and from 1 wt % to 5 wt % of a cross-linker. The wax particles can be present at from 10 wt % to 20 wt %, and can have an average particle size from 100 nm to 100 μm. At least a portion of the wax particles can have a particle size that is larger than an average thickness of the matrix.

It is noted that the term "pre-treatment coating" refers to either a composition used to form a coating layer as well as the coating layer itself, the context dictating which is applicable. For example, a pretreatment coating that includes an evaporable solvent is typically referring to the compositional coating that is applied to a media substrate. Once coated on a media substrate and after the evaporable solvent is removed, the resulting coating layer can also be referred to as a pre-treatment coating.

Generally, the matrix includes the components of the swellable pre-treatment coating except for the wax (and the evaporable solvent in the case of the swellable pre-treatment coating composition prior to its removal). The wax contains wax particles that extend beyond the underlying matrix once the swellable pre-treatment coating is applied as described herein. It has been discovered that such a structure allows the wax particles to protect the underlying matrix when the swellable pre-treatment coating contacts other substrates, objects, etc. The resulting effect is excellent durability of the swellable pre-treatment coating and printed images that may be printed thereon. Such durability provides retention of the print quality of the printed image, which can be measured by gloss, optical density, color bleed, scratch resistance, coalescence, water smudge, etc. Additionally, when used with the present matrix formulation, it has been discovered that the present swellable pre-treatment coating can be particularly useful for packaging and offset media.

Generally, the wax includes wax particles that when printed on a print medium, the particle size that is greater than the average thickness of the pre-treatment matrix. Turning to FIG. 1, a coated medium 100 can include a print medium 102 coated with a swellable pre-treatment coating 104. The swellable pre-treatment coating can include a matrix 106 embedded with wax particles 108. The wax particles generally extend above the surface of the matrix, though it is not required that all of the wax particles be larger in size than the thickness of the matrix. For example, the size of at least a portion of the wax particles can be greater than the thickness of the matrix. In one example, at least 50% of the wax particles can have a particle size greater than the thickness of the matrix. In one aspect, at least 75% of the wax particles can have a particle size greater than the thickness of the matrix. In one specific aspect, at least 90% of the wax particles can have a particle size greater than the thickness of the matrix. In one example, the matrix can have a thickness of 100 nm to 100 µm and the wax can have an average particle size of 100 nm to 100 µm. Though these ranges overlap, it is understood that a portion of the wax particles will be larger in size than the thickness of the matrix.

In further detail regarding the wax particle size, as mentioned these wax particles can have an average particle size of from 100 nm to 100 µm, from 0.5 µm to 50 µm, or from 1 µm to 50 µm. In another example, the wax particles can have an average particle size of 5 µm to 50 µm. In still another example, the wax particles can have an average particle size of 5 µm to 12 µm. In one aspect, the wax particles can have an average particle size of 12 µm to 20 µm. In one specific aspect, the wax particles can have an average particle size of about 8 µm. In another aspect, the wax particles can have an average particle size of about 15 µm to 18 µm. When particles are non-spherical, the largest diameter sphere that can be fitted within the particle can be considered D1. The smallest diameter sphere that can completely contain the particle can be considered D2. In one example, the "particle size" can be measured as the average of D1 and D2, which is referred to simply as D. Thus, when referring to "particle size" herein, the particle diameter D can be calculated. "Average particle size," on the other hand, refers to a plurality of particles, each having its own particle size, which are collectively averaged.

Additionally, the wax particles can be spread throughout the coating such that the particles have an average spacing S that is at least twice the diameter D of the particles. In one example, the average spacing S is at least 3 times D. In another example, the average spacing S is at least 4 times D.

Additionally the wax particles can be distributed so as to have an area density coverage that is within a specific range. The area density coverage is the percentage of the area of the media covered by the particles. According to this metric, each particle covers a portion of the media that is defined by a cylindrical projection of the particle that is normal to the media. Thus, the area covered would be defined by a circle having the same diameter (D) as the particle. In one example, the area density coverage would be in the range of 0.5% to 30% of the area of the media. In yet a more specific aspect, the area density coverage would be 1% to 10% of the area of the media. Some specific examples of area density coverage would be about 1%, about 4%, about 5% coverage. In general, an area coverage density that is above about 30% coverage may begin to adversely impact print quality. An area coverage density below about 0.5% may be insufficient to provide scratch and/or rub resistance of an image printed upon the media.

Generally, the wax particles can be chosen such that the ratio of the wax particle size to the thickness of the swellable pre-treatment coating plus any printed ink thereon is greater than 1. Such a ratio provides that the wax particles extend above the surface of printing on the swellable pre-treatment coating, thereby protecting the underlying printed image. In one example, the ratio can range from 10:1 to 1.01:1, and in one aspect, can range from 3:1 to 1.01:1. In another specific aspect, the ratio can range from 2:1 to 1.01:1, or even 1.1:1 to 1.01:1.

The wax can be selected based on various printing factors such as compatibility, particle size, melting point, etc. Typically, waxes are available as wax emulsions. Wax emulsions are commercially available from a number of vendors, for example Keim-Additec, Lubrizol, Michelman, and BYK Chemie. Wax emulsions useful for the present compositions can include but are not limited to: Lubrizol: Liquilube™ 411, Liquilube™ 406, Liquilube™ 488, Liquilube™ 443, Liquilube™ 454: Michelman: ME80825, ME48040, ME98040M1, ME61335, ME90842, ME91240, ML160; Keim-Additec: Ultralube® E-521/20, Ultralube® E-7093, Ultralube® 709511 Ultralube® E-8046 Ultralube® D806, Ultralube® E-502V, Ultralube® E-842N: Byk: Aquacer® 2650, Aquacer® 507, Aquacer® 533, Aquacer® 515, Aquacer® 537, Aquaslip™ 671, Aquaslip™ 942; Arkema: Orgasol® 2001 EXD NAT1, 3501 EXD NAT 1; Elementis: Slip-ayd® SL300, Slip-ayd® SL1618, Slip-ayd® 295A, combinations thereof, and the like.

Wax suspended in water includes, but is not limited to, particles of a synthetic wax, a natural wax, a combination of a synthetic wax and a natural wax, a combination of two or more different synthetic waxes, or a combination of two or more different natural waxes, for example. In some examples, the synthetic wax includes, but is not limited to, polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyurethane, polyethylenechlorotrifluoroethylene, polyethylene-vinyl acetate, epoxy resin, silicone resin, polyamide resin, polyamide, or polyester resin. In some examples, the natural wax includes, but is not limited to, carnauba wax, paraffin wax, montan wax, candelilla wax, ouricury wax, sufarcane wax, retamo wax, or beeswax. In one example, the wax can be a polyethylene wax.

In one example, the wax can have a melting point ranging from 60° C. to 156° C. Generally, the wax can be present in the swellable pre-treatment coating at a concentration ranging from 10 wt % to 20 wt %. In one example, the wax may be present in the range of 10 wt % to 15 wt %. In another example, the wax can be present ranging from 15 wt % to 20 wt %, and in one aspect, 11 wt % to 17 wt %. It is notable that these weight percentages of the wax are based on a total amount present in the swellable pre-treatment coating after removal of any evaporable solvent. Thus, they are intended to be weight percentages by solids once the swellable pre-treatment coating is applied to the media substrate and the evaporable solvent is driven off, i.e. the final wt % on the coated media substrate.

Additionally, the wax emulsions can be used with compatible binders and dispersants. By compatible, the present waxes can be used without causing aggregation or precipitation of the dispersants/binders particularly over extended periods of time (weeks/months at ambient temperature or days/weeks at elevated temperature such as 40° to 65° C.). Incompatibility can manifest itself variously by increases in wax particle size, phase separation of wax, or creaming at a faster rate than in the absence of destabilizing materials.

As discussed herein, the matrix generally includes the remaining elements of the swellable pre-treatment composition, i.e., solid components other than the wax and the evaporable solvent. The evaporable solvent is not part of the matrix either, as it is removed from the pre-treatment coating composition after application to the media substrate. The solvent can include or be water, or another aqueous or other solvent system that can be removed after application.

The matrix typically includes a fixer, aluminum chlorohydrate, a first binder, a second cross-linkable binder, and a cross-linker. Like the wax, it is notable that the matrix weight percentages herein are based on a total amount present in the swellable pre-treatment coating after removal of any evaporable solvent. Thus, the weight percentages are intended to be weight percentages by solids once the swellable pre-treatment coating is applied to the media substrate and the evaporable solvent is driven off, i.e. the final wt % on the coated media substrate, whether discussed in the context of the coating composition or the finished coating.

Notably, the present swellable pre-treatment coating includes two fixers, one being aluminum chlorohydrate (ACH) which provides good fixing efficiency without hygroscopic effect and the other not being particularly limited. As such, the use of two types of fixers can help balance the overall tackiness of the swellable pre-treatment coating. As such, in one example, the fixer can be more hygroscopic materials such as a polyvalent metal salt. There two fixers can be present in a ACH/fixer weight ratio ranging from 1:5 to 5:1. In one example, the ACH/fixer weight ratio can range from 3:1 to 1:1.

The fixer (that is not the ACH) can include a polyvalent metal salt and can be a divalent or a higher polyvalent metallic ion and anion. In one example, the polyvalent metal salt components can be soluble in water. Examples of polyvalent metallic ions include divalent metallic ions, such as $Ca^{2+}$, $Cu^{2+}$, $Ni^{2+}$, $Mg^{2+}$, $Zn^{2+}$ and $Ba^{2+}$; trivalent metallic ions, such as $Al^{3+}$, $Fe^{3+}$ and $Cr^{3+}$. In one example, the polyvalent metallic ion can be $Ca^{2+}$, $Mg^{2+}$ or $Zn^{2+}$. In one aspect, the polyvalent metallic ions can be $Ca^{2+}$. Examples of anions include $Cl^-$, $I^-$, $Br^-$, $NO_3^-$ or $RCOO^-$ (where R is H or any hydrocarbon chain). In one example, the polyvalent metal salt anion can be a chloride ($Cl^-$) or acetate ($CH_3COO^-$). In other examples, the polyvalent metal salt can be composed of divalent or polyvalent metallic ions and of nitrate or carboxylate ions. The carboxylate ions can be derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms include formic acid, acetic acid, propionic acid, butyric acid, isobutyric acid, valeric acid, isovaleric acid, pivalic acid and hexanoic acid.

In one example, the fixer can be a polyvalent metal salt including calcium chloride, calcium nitrate, magnesium nitrate, magnesium acetate or zinc acetate. In one aspect, the polyvalent metal salt can be calcium chloride or calcium nitrate ($CaCl_2$ or $Ca(NO_3)_2$). In one specific aspect, the polyvalent metal salt can be calcium chloride ($CaCl_2$).

Generally, the fixer can be present in the swellable pre-treatment coating at a concentration ranging from 10 wt % to 20 wt %. In one example, the fixer can be present in an amount ranging from 10 wt % to 15 wt %, and in one aspect, 15 wt % to 18 wt %. Additionally, the aluminum chlorohydrate can be present in the swellable pre-treatment coating at a concentration ranging from 25 wt % to 35 wt %. In one aspect, the aluminum chlorohydrate can be present in the swellable pre-treatment coating at a concentration ranging from 25 wt % to 30 wt %, and in one specific aspect, from 30 wt % to 35 wt %.

As mentioned also, the matrix can also include multiple binder. Namely, a first binder and a second cross-linkable binder. Examples of suitable first binders include cationic modified polyvinyl alcohol, polydiallyldimethylammonium chloride, polyethylenimine, polyamines, polyquaternium amine, cationic modified starch, cationic polyurethane dispersion, polyacrylamides, conjugated diene copolymers, functional group-modified polymers, cationic polymers, synthetic resin binders, and mixtures thereof, and the like. In one example, the first binder can be a cationic polymer. In one aspect, the first binder can be a cationic polyamide.

Examples of suitable second cross-linkable binders include binders listed herein that have cross-linkable functional groups, including polyacrylates, polyvinyls, polyvinyl alcohols, polyethylene oxide modified polyvinyl alcohols, polyvinyl acetate, starch, modified starch, water soluble cellulose derivatives, polyacrylamides, casein, gelatin, soybean protein, conjugated diene copolymer functional group-modified polymers, acrylic polymers, polyurethane, vinyl polymers synthetic resin binders, and mixtures thereof, and the like. In one example, the second cross-linkable binder can be PVA. If used as the binder, PVA can have a degree of hydrolysis from 72% to 99%, and, in one aspect, between about 88% and about 95%. The weight average molecular weight of PVA can be from about 1,000 Mw to 500,000 Mw, or, in one aspect, from 5,000 Mw to 500,000 Mw.

Generally, the first binder can be present in the swellable pre-treatment coating at a concentration ranging from 0.5 wt % to 10 wt %. In one example, the binder can be present in an amount ranging from 0.5 wt % to 5 wt %, and in one aspect, 5 wt % to 10 wt %. Additionally, the second cross-linkable binder can be present in the swellable pre-treatment coating at a concentration ranging from 20 wt % to 30 wt %. In one example, the binder can be present in an amount ranging from 20 wt % to 25 wt %, and in one aspect, 25 wt % to 30 wt %.

In conjunction with the second cross-linkable polymer, the present swellable pre-treatment coatings generally includes a cross-linker. In one example, the cross-linker can include boric acid, glyoxal (dialdehyde), Curesan™ 200 (blocked aldehyde) from BASF, divinylbenzene, ethylene glycol dimethacrylate, diethylene glycol dimethacrylate, triethlyene glycol dimethacrylate, cyclohexanedimethanol divinyl ether, 1,6-hexanediol diacrylate, divinyl adipate, trimethylolpropane triacrylate, pentaerythritol tri- and tetra (meth)acrylate and mixtures thereof. In one aspect, the cross-linker can be boric acid. Generally, the cross-linker can be present in the swellable pre-treatment coating at a concentration ranging from 1 wt % to 5 wt %. In one example, the cross-linker can be present in an amount ranging from 1 wt % to 3 wt %.

Further, the matrix can include surfactants. Non-limiting examples of suitable surfactants include nonionic surfactant, cationic surfactant and combinations thereof. In one example, the surfactant can be a nonionic surfactant. In one aspect, the surfactant can be a nonionic surfactant including nonionic fluorosurfactant, nonionic acetylenic diol surfactant, nonionic ethoxylated alcohol surfactant, or combinations thereof.

Several commercially available nonionic surfactants that can be used in the formulation of the pre-treatment composition include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), and Dynol™ series (e.g. Dynol™ 607 and Dynol™ 604) manufactured by Air Products and Chemicals, Inc.: fluorinated surfactants, such as those from the Zonyl® family (e.g., Zonyl® FSO and Zonyl® FSN surfactants), manufactured by E.I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

The surfactant can be present in the swellable pre-treatment composition in an amount up to about 1.5 wt %. In one example, the surfactant can be present in an amount ranging from about 0.1 wt % to about 1 wt %. In one aspect, the surfactant can be present in an amount ranging from about 0.2 wt % to about 0.6 wt %.

Other additives can be added to the swellable pre-treatment matrix including cross-linkers, defoamers, plasticizers, fillers, stabilizers, dispersants, biocides, optical brighteners, viscosity modifiers, leveling agents, UV absorbers, antiozonants, etc. Such additives can be present in the pre-treatment compositions in amounts from 0.01 wt % to 20 wt %.

Figure 2:
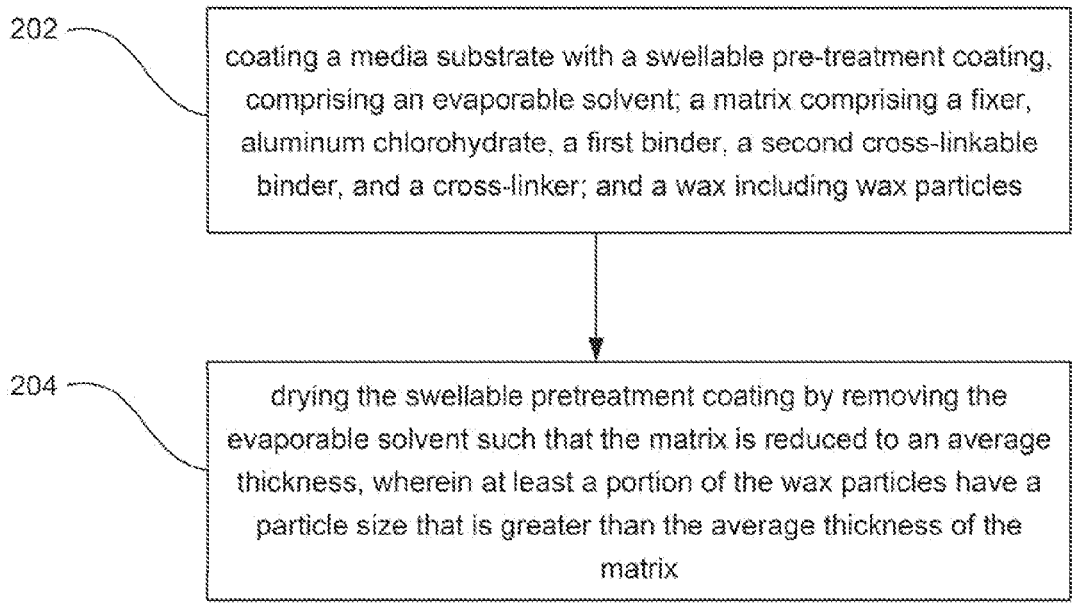
FIG. 2 depicts a flow chart of a method in accordance with an example of the present disclosure.

Referring to FIG. 2, a method 200 of providing a durable coating to a print medium can include coating 202 a substrate with a swellable pre-treatment coating, the swellable pre-treatment coating including any of those described herein, and drying 204 the swellable pre-treatment coating such that the matrix is reduced to a thickness. At least a portion of the wax particles can have a particle size that is greater than the thickness of the matrix.

General coating methods include slot-die coating, rod coating such as Mayer rod coating, blade coating, gravure coating, knife-over-roll coating, cascade coating, curtain coating, and the like. Generally the swellable pre-treatment coatings can be applied at a basis weight of 0.5 gsm to 20 gsm, one example, the basis weight can be from 0.5 gsm to 10 gsm, and in one aspect, from 0.5 gsm to 7 gsm. Within these ranges, the basis weight can be calculated to have an average basis weight within the respective ranges. Furthermore, manufacture and subsequent application to a print medium, the present swellable pre-treatment coatings initially include an evaporable solvent, e.g., water or other evaporable solvent or solvent system, allowing for processability, which can be removed via drying, heating, or ambient evaporation over time.

The present swellable pre-treatment coatings are generally used in conjunction with an inkjet ink. Such inkjet inks generally include a colorant dispersed or dissolved in an ink vehicle. As used herein, "liquid vehicle" or "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, end/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance of the formulation can be purified water, and the inkjet ink can optionally include a latex.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context dearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate the swellable pre-treatment compositions and methods that are presently known. However, it is to be understood that the following are only exemplary or illustrative of the application of the principles of the present compositions and methods. Numerous modifications and alternative swellable pre-treatment compositions and methods may be devised by those skilled in the art without departing from the spirit and scope of the present compositions and methods. The appended claims are intended to cover such modifications and arrangements. Thus, while the present swellable pre-treatment compositions and methods have been described above with particularity, the following examples provide further detail in connection with what are presently deemed to be acceptable.

Example 1

Swellable Pre-Treatment Coatings

Swellable Pre-treatment Coatings were prepared by admixing the components according to Tables 1A and 1B in water, and these compositions were coated on a packaging medium at an average basis weight of about 3 gsm. After coating, the media was dried to remove any solvents, providing the weight percentages listed in Tables 1A and 1B.

TABLE 1A

| Ingredients | Pre-treat Coating 1 (wt %) | Pre-treat Coating 2 (wt %) | Pre-treat Coating 3 (wt %) | Pre-treat Coating 4 (wt %) | Pre-treat Coating 5 (wt %) |
|---|---|---|---|---|---|
| ACH | — | 53.33 | 43.48 | 6.49 | 28.17 |
| $CaCl_2$ | — | 6.67 | 5.43 | 6.49 | 21.13 |
| Cationic polyamide | 13.99 | — | — | 25.79 | — |
| PVA | 41.96 | — | 43.48 | 51.95 | 28.17 |
| Boric Acid | 2.1 | — | 2.17 | 2.6 | 1.41 |
| Wax | 41.96 | 40 | 5.43 | 6.49 | 21.13 |
| Polyurethane Dispersion | — | — | — | — | — |
| Cationic acrylic latex | — | — | — | — | — |
| Polyacrylic emulsion | — | — | — | — | — |

TABLE 1B

| Ingredients | Pre-treat Coating 6 (wt %) | Pre-treat Coating 7 (wt %) | Pre-treat Coating 8 (wt %) | Pre-treat Coating 9 (wt %) |
|---|---|---|---|---|
| ACH | 14.29 | 35.40 | 35.87 | 44.44 |
| $CaCl_2$ | 14.29 | 17.7 | 17.94 | 22.22 |
| Cationic Polyamide | 57.14 | 8.85 | — | — |
| PVA | — | 26.55 | 26.91 | 11.11 |
| Boric Acid | — | 2.65 | 1.35 | — |
| Wax | 14.29 | — | — | — |
| Polyurethane Dispersion | — | — | — | 22.22 |
| Cationic acrylic latex | — | — | 17.94 | — |
| Polyacrylic Emulsion | — | 8.85 | — | — |

Example 2

Comparable Pre-Treatment Coatings

Comparable Pre-treatment Coatings were prepared by admixing the components according to Table 2 in water, and these coatings were applied by rod coating onto a swellable medium at an average basis weight of about 3 gsm. After coating, the media was dried to remove any solvents providing the eight percentages listed in Table 2.

TABLE 2

| Ingredients | Comparable Pre-treat Coating 10 (wt %) | Comparable Pre-treat Coating 11 (wt %) | Comparable Pre-treat Coating 12 (wt %) | Comparable Pre-treat Coating 13 (wt %) |
|---|---|---|---|---|
| Cationic polyamide | — | 100% | — | — |
| PVA | — | — | — | 100% |
| Polyurethane Dispersion | 100% | — | — | — |
| Cationic acrylic latex | — | — | 100% | — |

Example 3

Data

The Swellable Pre-treatment Coatings of Example 1 and comparable Pre-treatment Coatings of Example 2 were tested for differing print quality characteristics as listed in Table 3.

TABLE 3

| Pre-treatment Coating | Scratch Resistance | Color-to-color Bleed | Coalescence | Water Smudge |
|---|---|---|---|---|
| 1 | 4 | 1 | 1 | 1 |
| 2 | 2 | 5 | 4.5 | 4 |
| 3 | 3 | 5 | 4.5 | 0.5 |
| 4 | 4 | 5 | 4.5 | 2 |
| 5 | 5 | 5 | 4.5 | 1.5 |
| 6 | 3.5 | 5 | 4.5 | 2.5 |
| 7 | 4 | 5 | 5 | 1 |
| 8 | 2 | 5 | 5 | 2 |
| 9 | 2 | 5 | 5 | 2 |
| 10 | 1 | 1 | 1 | 1 |
| 11 | 1 | 5 | 5 | 1 |
| 12 | 3 | 1 | 1 | 3 |
| 13 | 4 | 1 | 1 | 1 |

Coatings 1-9 refer to those in Example 1
Coatings 10-13 refer to those in Example 2

Scratch resistance was measured by Sutherland® 2000 Rub Tester with ASTM F1571-95 standard test method. Color-to-color bleed was measured by visual ranking. Coalescence was measured by visual ranking. Water smudge was measured by Taber® 5750 Linear Abraser. The scores in Table 3 are based on a 1 to 5 scale, with 1 being the worst and 5 being the best.

The swellable pre-treatment compositions 1 to 9 show the performance effects of a combination of salts, polymeric binders and cationic binders. Pre-treatment Coating 1 showed poor image quality including color-to-color bleed and coalescence without addition of salts. Pre-treatment Coating 2 demonstrated that the good image quality can be achieved by salts. Pre-treatment Coating 3 demonstrated that the water smudge was degraded when the polyvinyl alcohol was added, but the scratch resistance was improved. Pre-treatment Coating 4 demonstrated that the scratch resistance was further improved when the cationic polyamide chlorohydrin was added and combined with PVA. Pre-treatment Coating 5 demonstrated that the higher amount of $CaCl_2$ degraded the water smudge resistance when PVA exists. Pre-treatment Coating 6 demonstrated that addition of cationic polyamide chlorohydrin alone slightly improves water smudge resistance, but shows worse scratch resistance compared with PVA. Pre-treatment Coating 7 demonstrated that adding different type of cationic acrylic latex did not improve the water smudge resistance. It shows that not all the cationic materials can have positive effect on water smudge resistance. Pre-treatment Coating 8 demonstrated that adding the additional cationic acrylic latex with a higher glass transition temperature (Tg) improved a little in water smudge resistance, but it also degraded the scratch resistance. Pre-treatment Coating 9 demonstrated that adding the additional cationic polyurethane latex improved a little in water smudge resistance, but it also degraded the scratch resistance.

Comparable Pre-treatment Coatings 10 to 13 demonstrate characteristics of various polymeric binders. Pre-treatment Coating 10: polyurethane dispersion showed poor performance across the board. Pre-treatment Coating 11: cationic polyamide chlorohydrin alone showed good color-to-color bleed control and coalescence, but did not show good performance in water smudge resistance and scratch resistance. Pre-treatment Coating 12: cationic acrylic latex showed average performance in scratch resistance and water smudge resistance, but was worse in color-to-color bleed control and coalescence. Pre-treatment Coating 13: polyvinyl alcohol alone showed a good scratch resistance, but was bad in color-to-color bleed, coalescence and water smudge resistance.

That being stated, it is noted that scratch resistance is a valuable criterion for the performance acceptance, followed by image quality and water smudge. In these examples, it is considered desirable when the ranking is equal or greater than 4 for scratch resistance, and equal or greater than 2 for water smudge resistance.

What is claimed is:

1. A swellable pre-treatment coating for a print medium, comprising:
    an evaporable solvent;
    a matrix, including:
        from 10 wt % to 20 wt % of a fixer,
        from 25 wt % to 35 wt % of aluminum chlorohydrate,
        from 0.5 wt % to 10 wt % of a first binder,
        from 20 wt % to 30 wt % of a second cross-linkable binder, and
        from 1 wt % to 5 wt % of a cross-linker; and
    a wax present at from 15 wt % to 20 wt %,
    wherein weight percentages of the matrix and the wax are based on a total amount present in the swellable pre-treatment coating after removal of the evaporable solvent.

2. The swellable pre-treatment coating of claim 1, wherein the fixer is a polyvalent salt.

3. The swellable pre-treatment coating of claim 2, wherein the polyvalent salt is selected from the group of calcium chloride, calcium nitrate, magnesium nitrate, magnesium acetate, zinc acetate, and mixtures thereof.

4. The swellable pre-treatment coating of claim 1, wherein the first binder is selected from the group of cationic modified polyvinyl alcohol, polydiallyldimethylammonium chloride, polyethylenimine, polyamines, polyquaternium amine, cationic modified starch, cationic polyurethane dispersion, polyacrylamides, conjugated diene copolymers, functional group-modified polymers, cationic polymers, synthetic resin binders, and mixtures thereof.

5. The swellable pre-treatment coating of claim 1, wherein the first binder is a cationic polyamide.

6. The swellable pre-treatment coating of claim 1, wherein the second cross-linkable binder is selected from the group of polyacrylates, polyvinyls, polyvinyl alcohols, polyethylene oxide modified polyvinyl alcohols, polyvinyl acetate, starch, modified starch, water soluble cellulose derivatives, polyacrylamides, casein, gelatin, soybean protein, conjugated diene copolymers, functional group-modified polymers, acrylic polymers, polyurethane, vinyl polymers synthetic resin binders, and mixtures thereof.

7. The swellable pre-treatment coating of claim 1, wherein the second cross-linkable binder is polyvinyl alcohol.

8. The swellable pre-treatment coating of claim 1, wherein the wax is selected from the group of polyethylene wax, polyethylene, polypropylene, polyamide, polytetrafluoroethylene, carnuba, and mixtures thereof.

9. A printable medium, comprising:
    a media substrate; and
    a swellable pre-treatment coating applied to the media substrate, the swellable pre-treatment coating, comprising:
        a matrix, including:
            from 10 wt % to 20 wt % of a fixer;
            from 25 wt % to 35 wt % of aluminum chlorohydrate;
            from 0.5 wt % to 10 wt % of a first binder;
            from 20 wt % to 30 wt % of a second cross-linkable binder; and
            from 1 wt % to 5 wt % of a cross-linker; and
        wax particles present at from 15 wt % to 20 wt %.

10. The printable media of claim 9, wherein at least 50% of the wax particles have a particle size greater than the average thickness of the matrix.

11. The printable media of claim 9, wherein the wax particles have an average spacing in the matrix that is at least twice an average size of the wax particles.

12. The printable media of claim 9, wherein the wax particles in the matrix have an area density coverage in the range of 0.5% to 30%.

13. The printable media of claim 9, wherein an average size of wax particles to average thickness of the matrix is at a ratio from 10:1 to 1.01:1.

14. A method of providing a durable coating to a print medium, comprising:
    coating a media substrate with a swellable pre-treatment coating, comprising:
        an evaporable solvent,
        a matrix, comprising:
            from 10 wt % to 20 wt % of a fixer,
            from 25 wt % to 35 wt % of aluminum chlorohydrate,
            from 0.5 wt % to 10 wt % of a first binder,
            from 20 wt % to 30 wt % of a second cross-linkable binder, and
            from 1 wt % to 5 wt % of a cross-linker; and a wax present at from 15 wt % to 20 wt % including wax particles, wherein weight percentages of the matrix and the wax are based on a total amount present in the swellable pre-treatment coating after removal of the evaporable solvent; and drying the swellable pre-treatment coating by removing the evaporable solvent such that the matrix is reduced to an average thickness.

15. The method of claim 14, wherein at least 50% of the wax particles have a particle size greater than the thickness of the matrix.

16. The swellable pre-treatment coating of claim 1, wherein the cross-linker is boric acid.

17. The printable media of claim 9, wherein the cross-liner is boric acid.

18. The method of claim 14, wherein the cross-linker is boric acid.

19. The printable medium of claim 9, wherein at least a portion of the wax particles have a particle size that is greater than the average thickness of the matrix.

20. The method of claim 14, wherein at least a portion of the wax particles have a particle size that is greater than the average thickness of the matrix.

21. The printable medium of claim 9, wherein the wax particles having an average particle size from 100 nm to 100 μm.

* * * * *

UNITED STATES PATENT AND TRADEMARK OFFICE
CERTIFICATE OF CORRECTION

PATENT NO. : 9,505,938 B2  
APPLICATION NO. : 14/654963  
DATED : November 29, 2016  
INVENTOR(S) : Bor-Jiunn Niu et al.

It is certified that error appears in the above-identified patent and that said Letters Patent is hereby corrected as shown below:

In Column 12, Line 30 approx., in Claim 8, delete "carnuba" and insert -- caranuba --, therefor.

Signed and Sealed this  
Fourth Day of April, 2017

Michelle K. Lee  
*Director of the United States Patent and Trademark Office*